(12) United States Patent
Mortazavi et al.

(10) Patent No.: US 10,974,202 B2
(45) Date of Patent: Apr. 13, 2021

(54) MODIFIED CERAMIC MEMBRANES FOR TREATMENT OF OIL SANDS PRODUCED WATER, DISCHARGE WATER AND EFFLUENT STREAMS

(71) Applicant: Her Majesty the Queen in Right of Canada as Represented by the Minister of Natural Resources, Ottawa (CA)

(72) Inventors: Saviz Mortazavi, Ottawa (CA); Andre Yves Tremblay, Ottawa (CA); Charbel Atallah, Ottawa (CA)

(73) Assignee: HER MAJESTY THE QUEEN IN RIGHT OF CANADA AS REPRESENTED BY THE MINISTER OF NATURAL RESOURCES, Ottawa (CA)

( * ) Notice: Subject to any disclaimer, the term of this patent is extended or adjusted under 35 U.S.C. 154(b) by 0 days.

(21) Appl. No.: 16/083,046

(22) PCT Filed: Jul. 26, 2017

(86) PCT No.: PCT/CA2017/050899
§ 371 (c)(1),
(2) Date: Sep. 7, 2018

(87) PCT Pub. No.: WO2018/112599
PCT Pub. Date: Jun. 28, 2018

(65) Prior Publication Data
US 2020/0156012 A1    May 21, 2020

Related U.S. Application Data

(60) Provisional application No. 62/438,643, filed on Dec. 23, 2016.

(51) Int. Cl.
| | | |
|---|---|---|
| *B01D 61/14* | (2006.01) | |
| *B01D 67/00* | (2006.01) | |
| *B01D 69/02* | (2006.01) | |
| *B01D 71/02* | (2006.01) | |
| *B01D 71/70* | (2006.01) | |
| *C02F 1/44* | (2006.01) | |
| *C02F 101/32* | (2006.01) | |
| *C02F 103/10* | (2006.01) | |
| *C02F 103/36* | (2006.01) | |
| *B01D 69/12* | (2006.01) | |

(52) U.S. Cl.
CPC .......... *B01D 69/02* (2013.01); *B01D 61/147* (2013.01); *B01D 67/0093* (2013.01); *B01D 69/12* (2013.01); *B01D 71/024* (2013.01); *B01D 71/025* (2013.01); *B01D 71/70* (2013.01); *C02F 1/444* (2013.01); *B01D 2325/36* (2013.01); *C02F 2101/32* (2013.01); *C02F 2103/10* (2013.01); *C02F 2103/365* (2013.01)

(58) Field of Classification Search
CPC ........................... B01D 71/024; B01D 71/025; B01D 67/0093; C02F 2101/32
See application file for complete search history.

(56) References Cited

U.S. PATENT DOCUMENTS

| | | | |
|---|---|---|---|
| 2011/0042299 A1 | 2/2011 | Zhang et al. | |
| 2013/0184418 A1 | 7/2013 | Shahgaldian et al. | |
| 2013/0240445 A1* | 9/2013 | Vizvardi | B01D 65/08 210/650 |
| 2014/0262253 A1* | 9/2014 | Higgins | B01D 65/02 166/267 |

FOREIGN PATENT DOCUMENTS

| | | |
|---|---|---|
| EP | 2567940 A1 | 3/2013 |
| JP | H10226536 A | 8/1998 |
| WO | 2015168383 A1 | 11/2015 |

OTHER PUBLICATIONS

"SIM6492.7-2-[Methoxy(Polyethyleneoxy)6-9Propyl]Trimethoxysilane, tech-90"—Gelest, MSDS, iss. May 8, 2014; rev. Apr. 8, 2020 (Year: 2014).*
Zhou, J. et al., "Separation of Stable Oil-Water Emulsion by the Hydrophilic Nano-Sized ZrO2 Modified Al2O3 Microfilration Membrane," Separation and Purification Technology, 75/3, pp. 243-248, Nov. 20, 2010.
Krajewski, S.R. et al., "Grafting of ZrO2 Powder and ZrO2 Membrane by Fluoroalkylsilanes," Colloids and Surfaces A: Physiochemical and Engineering Aspects, 243/1, pp. 43-47, Aug. 20, 2004.
Arkles, B. et al., "The Role of Polarity in the Structure of Silanes Employed in Surface Modification," Silanes and other Coupling Agents, vol. 5, pp. 51-64, CRC Press, Mar. 16, 2009.
Atallah, C. et al., "Silane Surface Modified Ceramic Membranes for the Treatment and Recycling of SAGD Produced Water," Journal of Petroleum Science and Engineering, 157, pp. 349-358, Jul. 5, 2017.
International Search Report and Written Opinion for Application No. PCT/CA2017/050899, dated Sep. 25, 2017, 10 pages.
Canada Office Action 1, for Canadian Application No. 3,016,371, dated Sep. 16, 2019, 5 pages.

(Continued)

Primary Examiner — Bradley R Spies
(74) Attorney, Agent, or Firm — Hoffman Warnick LLC

(57) ABSTRACT

The present invention relates to modified ceramic membranes for the treatment of water. The invention discloses a modified ceramic membrane, comprising: a ceramic membrane, and an outer surface of said ceramic membrane is grafted by a hydrophilic organosilane, wherein said organosilane is selected from the group consisting of: CH3O(C2H4O)x(CH2)ySi(OCH3)3, where x is >4 and y is >0; CH3O(C2H4O)x(CH2)ySi(OCH2CH3)3, where x is >4 and y is >0; (CH3O)3Si(CH2)yO(C2H4O)x(CH2)ySi(OCH3)3, N where x is >4 and y is >0; and (CH3CH2O)3Si(CH2)yO(C2H4O)x(CH2)ySi(OCH2Cl-13)3, where x is >4 and y is >0.

21 Claims, 9 Drawing Sheets

(56) References Cited

OTHER PUBLICATIONS

Canada Office Action 2, for Canadian Application No. 3,016,371, dated Jan. 9, 2020, 4 pages.
Faibish et al., "Fouling-Resistant Ceramic-Supported Polymer Membranes for Ultrafiltration of Oil-in-Water Microemulsions," Journal of Membrane Science, pp. 129-143, dated Apr. 2, 2001.

* cited by examiner

MODIFIED CERAMIC MEMBRANES FOR TREATMENT OF OIL SANDS PRODUCED WATER, DISCHARGE WATER AND EFFLUENT STREAMS

FIELD OF THE INVENTION

The present invention relates to modified ceramic membranes for the treatment of oil sands produced water, discharge water, bitumen containing wastewater or process waters, oily wastewaters and effluent streams.

BACKGROUND OF THE INVENTION

One of the prominent issues in oil and gas exploration and production is the production of large volumes of waste in the form of produced water. These waters are produced in large quantity and need to be treated before recycling or disposal. For example, a leading technology used for bitumen extraction from oil sands is a process known as Steam Assisted Gravity Drainage (SAGD), which consists of drilling a pair of horizontal wells four to six meters apart where steam is injected into the top well (the injection well) to heat the surrounding heavy oil, reducing its viscosity and allowing it to flow by gravity into the bottom well (producing well). This SAGD process results in an emulsion of oil and condensed water that is pumped to the surface for separation and treatment. Effective treatment and recycling the processed water resulted from the SAGD process will assist to maintain the sustainability of the oil sands industry, and ensure the preservation of natural freshwater resources.

For over twenty years, membrane separation technologies, due to their high separation efficiency and the relatively simple operational process associated with membrane modules, have been studied by the oil and gas industry in an attempt to remove oil and other contaminants from produced water.

In particular, ceramic membranes have been used due to their chemical and thermal stability. Ceramic membranes are generally less vulnerable to the surrounding media than polymeric membranes, and are suitable for use over a wide range of temperatures and pH.

Universal acceptance of membranes for produced water treatment, however, has been hindered by the fouling observed in treating these feed streams, where fouling results from the adhesion of non-permeating species onto the membrane surface or from the deposition of these particles into the pores of the membrane, obstructing the flow of the permeating species which leads to an increase in transmembrane concentration and pressure gradients.

Researchers have attempted to develop various fouling remediation techniques, including applying ultrasonic fields to break up surface deposits, backflushing with permeate and use of different chemical cleaning agents. These methods, however, necessitate longer periods of equipment shutdown and inactivity, leading to operation inefficiency and an undesired increase of operational costs.

An indirect method to reduce membrane fouling when treating produced water is through surface chemistry modifications of the membranes themselves. This is typically done through the addition of chemical compounds that adhere to the membrane surface, thus changing the physicochemical properties of the selective layer. The modification would ideally result in a reduction of the attractive forces to the components that have been identified as foulants.

In the case of SAGD process produced water, however, prominent foulants may include a multitude of both organic and inorganic substances that possess high scale forming potential.

Ceramic membranes including metal oxides such as alumina, titania and zirconia, grafted polymers and zeolites have been modified using different agents. All of these common surface modifications have been proven successful in forming hydrophilic layers on the membrane surface. The application of these modifying agents for the filtration of oil and water emulsions improved membrane flux and mitigated any irreversible fouling.

Another group of low surface energy modifying agents is organosilanes, which are capable of rendering active membrane layers that possess either hydrophilic or hydrophobic properties. Organosilanes have been used to modify various hydroxyl group-bearing surfaces, having initially been used on inorganic minerals such as mica. They have since been applied to ceramic membranes with selective layers composed of alumina, zirconia and titania.

To date, however, the use of these silane-modified ceramic membranes has been heavily focused on gas separation, membrane distillation and protein separation. In contrast, silane modifying agents have been sparsely explored for the treatment of oil and water emulsions. In the few studies that have been performed, halogenated alkylsilanes were used to render the ceramic membranes hydrophobic and remove water as a bituminous or oil contaminant. This is not ideal when dealing with produced water from processes such as SAGD, where one would prefer to recuperate the purified water as the permeate.

Therefore, there remains the need for efficient and effective treatment of oil sands produced water.

SUMMARY OF THE INVENTION

According to the present application, organosilane modifying agent was selected to maintain the hydrophilicity of the metal oxide selective layer and reduce the number of hydroxyl groups on the oxide surface. Ceramic membrane disks were modified using this organosilane modifying agent and the modified ceramic membrane were used to treat SAGD produced waters.

According to one aspect of the invention, it is provided a modified ceramic membrane, comprising:
 a ceramic membrane, and
 an outer surface of said ceramic membrane is grafted by a hydrophilic organosilane, wherein said organosilane is selected from the group consisting of:
 $CH_3O(C_2H_4O)_x(CH_2)_ySi(OCH_3)_3$, where x is >4 and y is >0;
 $CH_3O(C_2H_4O)_x(CH_2)_ySi(OCH_2CH_3)_3$, where x is >4 and y is >0;
 $(CH_3O)_3Si(CH_2)_yO(C_2H_4O)_x(CH_2)_ySi(OCH_3)_3$, where x is >4 and y is >0; and
 $(CH_3CH_2O)_3Si(CH_2)_yO(C_2H_4O)_x(CH_2)_ySi(OCH_2CH_3)_3$, where x is >4 and y is >0.

According to another aspect of the invention, it is provided use of a modified ceramic membrane for water purification, said modified ceramic membrane comprising:
 a ceramic membrane, and
 an outer surface of said ceramic membrane is grafted by a hydrophilic organosilane, wherein said organosilane is selected from the group consisting of:
 $CH_3O(C_2H_4O)_x(CH_2)_ySi(OCH_3)_3$, where x is >4 and y is >0;

$CH_3O(C_2H_4O)_x(CH_2)_ySi(OCH_2CH_3)_3$, where x is >4 and y is >0;

$(CH_3O)_3Si(CH_2)_yO(C_2H_4O)_x(CH_2)_ySi(OCH_3)_3$, where x is >4 and y is >0; and $(CH_3CH_2O)_3Si(CH_2)_yO(C_2H_4O)_x(CH_2)_ySi(OCH_2CH_3)_3$, where x is >4 and y is >0.

According to a preferred embodiment, the support layer of the ceramic membranes is composed of titania.

According to a preferred embodiment, the selective layer of the membranes is made from alumina.

According to a preferred embodiment, the selective layer of the membranes comprised a mixture of alumina, titania and metal oxides.

According to a preferred embodiment, the selective layer of the membranes comprised $ZrO_2$.

According to a preferred embodiment, the selective layer of the membranes comprised $TiO_2$.

According to a preferred embodiment, the selective layer of the membranes comprised a mixture of $ZrO_2$ and $TiO_2$.

According to a preferred embodiment, the selective layer of the membranes comprised a mixture of alumina and titania.

According to a preferred embodiment, the selective layer of the membranes comprised a mixture of alumina and $ZrO_2$.

According to a preferred embodiment, the hydrophilic organosilane is 2-[methoxy(polyethyleneoxy)6-9 propyl]trimethoxysilane.

According to a preferred embodiment, water purification is for oil sands produced water and bitumen containing process and wastewaters.

According to a preferred embodiment, the oil sands produced water is from a SAGD process or other oil extraction and refining processes.

Other features and advantages of the present invention will become apparent from the following detailed description and the accompanying drawings, which illustrate, by way of example, the principles of the invention.

DETAILED DESCRIPTION OF THE INVENTION

Figure 1:
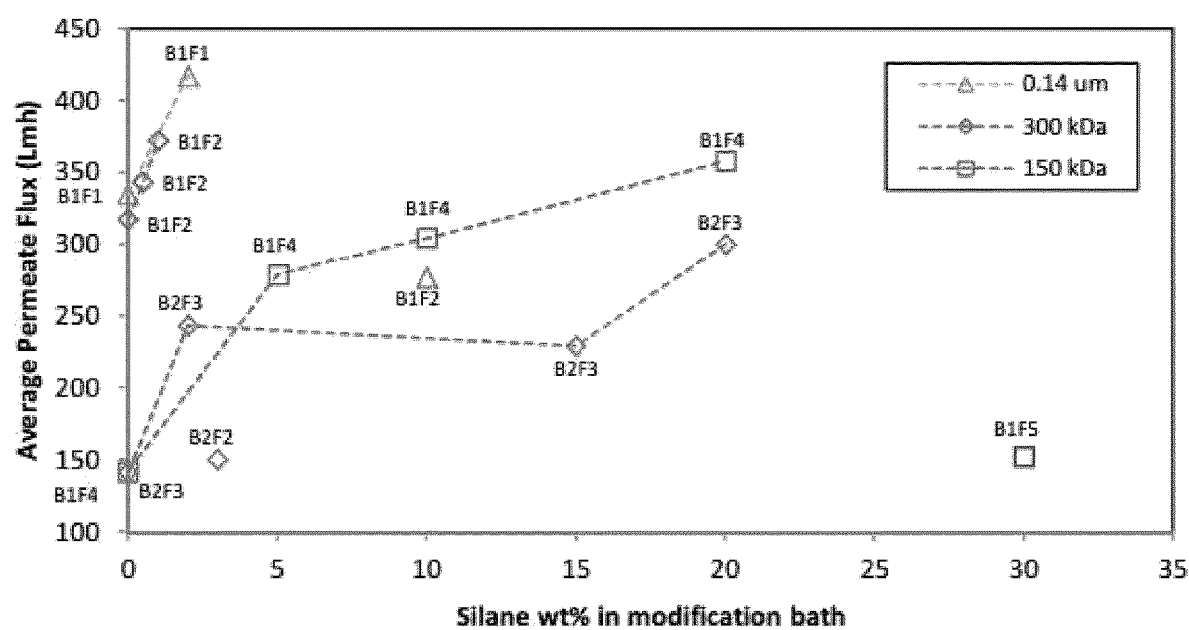
FIG. 1 is a graph showing permeate flux as a function of the concentration of silane PEOTMS in the modification bath for the 150 kDa, 300 kDa and 0.14 μm membrane disks.

The present invention addresses treatment of oil sands produced water, discharge water and effluent streams by using modified ceramic membranes.

When identifying possible foulants in the filtration of SAGD produced water, bitumen-associated solids must be taken into consideration. These solids include aggregates of quartz, clays and heavy minerals bound together by carbonates, iron oxide and humic matter. However, the most problematic of the bitumen-associated solids have been determined as being ultrafine clays. These ultrafine clays are very thin alumino-silicate clay crystallites onto which organic bitumen molecules and humic matter are adsorbed.

Therefore, major foulants targeted by the present application are silicates and adsorbed carbon-rich solids. The surfaces of heavy bitumen molecules, such as asphaltenes, have been shown to possess acidic, basic and amphoteric functional groups. This indicates that bituminous fines can exhibit both negative and positive surface charges. Combining this with the fact that the IEPs of the ceramic materials discussed above can vary significantly, it is evident that maintaining the electrostatic repulsion of the identified foulants is a difficult task. Hence, the attraction of these foulants to the ceramic membrane surface is a significant hindrance that needs to be addressed.

Surfaces of unmodified ceramic membranes are hydrophilic due to the charged hydroxyl groups that populate the top layer. For metal oxide ceramics, the predominant surface charge is dependent on the pH. In other words, if the pH is above the isoelectric point (IEP) of the ceramic material, the predominant surface charge is negative, while at a pH that is below the IEP, the predominant surface charge is positive. The pH is thus an important feed parameter, since it determines the surface charge of the membrane selective layer.

The present application discloses that charge neutral hydrophilic ceramic membrane surfaces enhance the performance of ceramic membranes in treating produced waters containing bituminous fines.

According to the present application, organosilane modifying agent was selected to maintain the hydrophilicity of the metal oxide selective layer and reduce the number of hydroxyl groups on the oxide surface. Ceramic membrane disks were modified using this organosilane modifying agent and the modified ceramic membrane were used to treat SAGD produced waters.

To maintain desirable hydrophilic properties without surface charges, hydrophilic and neutral organosilane was used to modify the surface of ceramic membrane disks.

The organosilanes used for the silanation of the membrane surfaces is selected from the group consisting of:

$CH_3O(C_2H_4O)_x(CH_2)_ySi(OCH_3)_3$, where x is >4 and y is >0;

$CH_3O(C_2H_4O)_x(CH_2)_ySi(OCH_2CH_3)_3$, where x is >4 and y is >0;

$(CH_3O)_3Si(CH_2)_yO(C_2H_4O)_x(CH_2)_ySi(OCH_3)_3$, where x is >4 and y is >0; and $(CH_3CH_2O)_3Si(CH_2)_yO(C_2H_4O)_x(CH_2)_ySi(OCH_2CH_3)_3$, where x is >4 and y is >0.

The modified ceramic membranes were then used in the filtration of SAGD produced water.

Modified ceramic membranes have mitigated the irreversible fouling caused by bituminous ultrafines.

For example, the permeate flux of the 150 and 300 kDa membranes more than doubled after modification in a 20% silane solution.

Furthermore, the filtered water obtained from the modified membranes was of superior quality, to that of the untreated membrane, as shown by total organic carbon and particle size analysis.

Examples

The ceramic membrane disks in the examples are from Sterlitech Corporation (Kent, Wash. USA). The membranes had a diameter of 47 mm, a thickness of 2.5 mm, and offered an overall mass transfer surface area of 13.1 cm². The support layer of these membranes was composed of titania. The selective layer of the 0.14 μm (≈1250 kDa) membranes was made from alumina, while the selective layer of the 150 kDa and 300 kDa Molecular Weight Cut-off (MWCO) membranes contained a mix of $ZrO_2$ and $TiO_2$.

Anhydrous ethanol and acetic acid were used in the silane surface grafting process.

The organosilane used for the silanation of the membrane surfaces is shows in Formula (I) below and listed in Table 1.

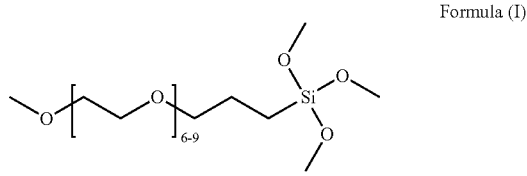

Formula (I)

As shown, a hydrophilic silane containing polyethylene oxide (PEO) chains, [methoxy(polyethyleneoxy)propyl]trimethoxysilane (PEOTMS), was selected as it offered an extremely low water contact angle of 15-16°, one of the lowest among commercially available organosilanes.

TABLE 1

| Organosilane used for the silanation of the membrane surfaces | | |
|---|---|---|
| Name | Formula | Notation |
| 2-[METHOXY(POLYETHYLENEOXY)6-9 PROPYL]TRIMETHOXYSILANE | $CH_3O(C_2H_4O)_{6-9}$ $(CH_2)_3Si(OCH_3)_3$ | PEOTMS |

The feed used to conduct the filtration tests was a sample of SAGD produced water was supplied by SAGD operations located in Canada's oil sands in Alberta to CanmetMINING (NRCan).

To prevent clogging the gear pump used to circulate feed in the test system; the SAGD process water was coarsely filtered using a 50 micron paper filter prior to use.

Silanating was by deposition from aqueous alcohol solutions. A solution of 95% ethanol/5% water by weight is prepared. The solution is then adjusted to a pH of 4.5-5.5 using acetic acid. Then silanating agent is added with stirring to yield a desired final concentration. The silane concentration was varied from 0.5 to 30 wt %. Following the addition of the silane, 5 minutes were allowed for hydrolysis and silanol formation. The membranes were then immersed into the solution for 2 minutes while being gently agitated. Once removed from the silane solution, the membranes were briefly rinsed in ethanol in order to remove any excess materials and unreacted silane. Finally, the modified membranes were placed in an oven, under nitrogen and at 110° C., for 10 minutes to cure the silane.

The composition of inorganics in the SAGD produced water samples was determined and is provided in Table 2 below.

TABLE 2

| Average inorganic composition of SAGD produced water feed | | | | | | | | |
|---|---|---|---|---|---|---|---|---|
| Component | Na | Si | B | K | S | Ca | Mg | Sr | Ba |
| Composition (ppm) | 476 | 94.1 | 27.7 | 15.2 | 14.2 | 2.30 | 0.491 | 0.159 | 0.0284 |

For the experiments conducted, five samples of wastewater feed were extracted from the same drum on different dates. In Table 3, these samples are assigned a label and their pH is given.

TABLE 3

| Label and pH of SAGD wastewater feed samples | | | | | |
|---|---|---|---|---|---|
| Feed Sample | F1 | F2 | F3 | F4 | F5 |
| pH | 7.93 | 8.84 | 7.58 | 7.75 | 7.99 |

Both the SAGD wastewater feed and the permeate samples were subjected to a particle size analysis, which allowed for the verification of the molecular weight cut-off of the ceramic membranes. The samples were all analyzed in a Zetasizer™ Nano S90 (Malvern Instruments Ltd). Samples of 3 mL were placed in the particle size analyzer, and the refractive index of diluted bitumen was taken as 1.58.

A total organic carbon analysis of all feed and permeate samples was also conducted.

The filtration experiments were conducted using a cross-flow filtration system. The entire setup was placed in a walk-in fume hood in order to reduce emissions from the SAGD produced water recirculated in the system. All of the filtration tests were conducted at temperatures ranging from 84 to 88° C. The experiments using the 0.14 μm membranes were carried out at a transmembrane pressure (TMP) of 68.95 kPa (10 psi), while all other membranes were subjected to a TMP of 172.6 kPa (25 psi). The TMP of each run was maintained constant through the use of a pressure relief valve. In order to remediate fouling, the system was backflushed with permeate for 5 seconds every 295 seconds at 103.4 kPa (15 psi) when using the 0.14 μm membrane, and at 206.8 kPa (30 psi) for all other membranes. Initially, 3.7 L of SAGD produced water was loaded into the feed tank and fed to the membrane with a cross-flow velocity of 1.2 m/s. The system was operated with total retentate recycling, while the permeate was collected in a separate container and periodically recycled back to the feed tank. The flowrate of the permeate stream was monitored using a Coriolis flow meter.

The duration of each run ranged from approximately 3.5 to 4 hours, as this amount of time was considered to be sufficient in order to establish any differences between the modifications.

The run conditions of the modified membranes using agent PEOTMS and the unmodified membranes are summarized in Tables 4-6 below.

TABLE 4

Test conditions for the unmodified and modified 150 kDa membrane using agent PEOTMS. Operating pressure 172.6 kPa (25 psi) Trans Membrane Pressure, backflushing with permeate for 5 s every 295 s @ 206.8 kPa (30 psi).

| Surface Modification | Membrane Lot# | SAGD wastewater feed sample | Feed Temperature (° C.) |
|---|---|---|---|
| Unmodified | 131113U150 | F4 | 85-87 |
| 5% a | 131113U150 | F4 | 85-88 |
| 10% a | 131113U150 | F4 | 85-88 |
| 20% a | 131113U150 | F4 | 85-88 |
| 30% a | 131113U150 | F5 | 85-88 |

TABLE 5

Test conditions for the unmodified and modified 300 kDa membrane using agent PEOTMS. Operating pressure 172.6 kPa (25 psi) Trans Membrane Pressure, backflushing with permeate for 5 s every 295 s @ 206.8 kPa (30 psi).

| Surface Modification | Membrane Lot # | SAGD wastewater feed sample | Feed Temperature (° C.) |
|---|---|---|---|
| Unmodified | 191110U300 | F2 | 87 |
| 0.5% a | 191110U300 | F2 | 84-87 |
| 1% a | 191110U300 | F2 | 85-87 |
| Unmodified | 140312U300 | F3 | 86-88 |
| 2% a | 140312U300 | F3 | 86-87 |
| 3% a | 140312U300 | F2 | 85-88 |
| 15% a | 140312U300 | F3 | 86-87 |
| 20% a | 140312U300 | F3 | 85-87 |

TABLE 6

Test conditions for the unmodified and modified 0.14 um membrane using agent PEOTMS. Operating pressure 68.95 kPa (10 psi) Trans Membrane Pressure, backflushing with permeate for 5 s every 295 s @ 103.4 kPa (15 psi).

| Surface Modification | Membrane Lot# | SAGD wastewater feed sample | Feed Temperature (° C.) |
|---|---|---|---|
| Unmodified | 190310M014 | F1 | 84-87 |
| 2% a | 190310M014 | F1 | 87 |
| 10% a | 190310M014 | F2 | 84-86 |

The tables are sectioned according to the manufacturer's membrane lot numbers. The increase or reduction in membrane flux as a result of treatment was compared within a lot and for the same feed. The average flux over the entire filtration period for the 150 kDa, 300 kDa and 0.14 μm membranes is shown in FIG. 1 at different modifying agent concentrations.

Referring to FIG. 1, the dashed lines in the plot demonstrate the correlation between flux and silane concentration for filtration tests that were run using the same feed sample, as well as membranes originating from the same batch.

All membranes modified in a bath containing 20% of PEOTMS or less showed an increase in flux performance compared to the unmodified membranes. The greatest increase in performance was observed for the 150 kDa and 300 kDa membranes at a concentration of 20%, where the flux of the modified membrane was 2.5 and 2.2 times that of the unmodified membrane, respectively.

The flux of the 0.14 μm membrane also showed an increase in flux along the trend of the 150 and 300 kDa membranes. The 30% PEOTMS 150 kDa membrane was run with a different feed sample and was not retained for comparison. Similar cases are seen with the 3% PEOTMS 300 kDa and 10% PEOTMS 0.14 μm membranes.

All membranes were tested from SAGD process water originating from a single drum. However, the pH of the feed varied throughout the tests.

When membranes of the same batch were run using a feed having a higher pH, a decline in flux was observed. Previous studies have shown that the dissociation of soluble silica, in the form of silicic acid, grows more prominent as the pH surpasses neutral, and silicic acid dissociates into silicate anions, which can then react with the calcium or magnesium found in the wastewater feed to produce insoluble silicates, which may account for the observed decline in permeate flux at higher pH values.

Nonetheless, the flux of all membranes from the same batch and run with the same feed increased as a result of a treatment with agent PEOTMS. This trend was even observed for silane concentrations as low as 0.5%, as evidenced by the 300 kDa membranes, which demonstrates that the silane modification is effective in releasing bitumen fines from the surface of the modified membrane and thus reducing the severity of the fouling phenomenon.

The accumulation of colloids and fines on the surface of the membrane is a natural consequence of the filtration process which results in a decline of permeate flux over time. The accumulation of particles is mitigated by the presence of tangential flow over the surface of the membrane and backflushing.

Particles on the surface of the membrane are partly swept away by feed circulating across the surface of the membrane and released from the surface by backflushing. Over time, the flux will stabilize, where an equal amount of particles are deposited on and released from the surface of the membrane. The number of particles arriving on the surface of the membrane is related to the volume of process water filtered and the concentration of particulates and colloids in the process water.

During a run, permeate from the membrane was collected in a container placed on the permeate balance. It was recycled periodically back to the feed tank. Initially, the feed tank contained 3.7 L of SAGD produced water. As permeate was collected, the concentration of particulates in the feed increased. It is important to determine the effect of this increase in concentration on membrane flux.

Figure 2:
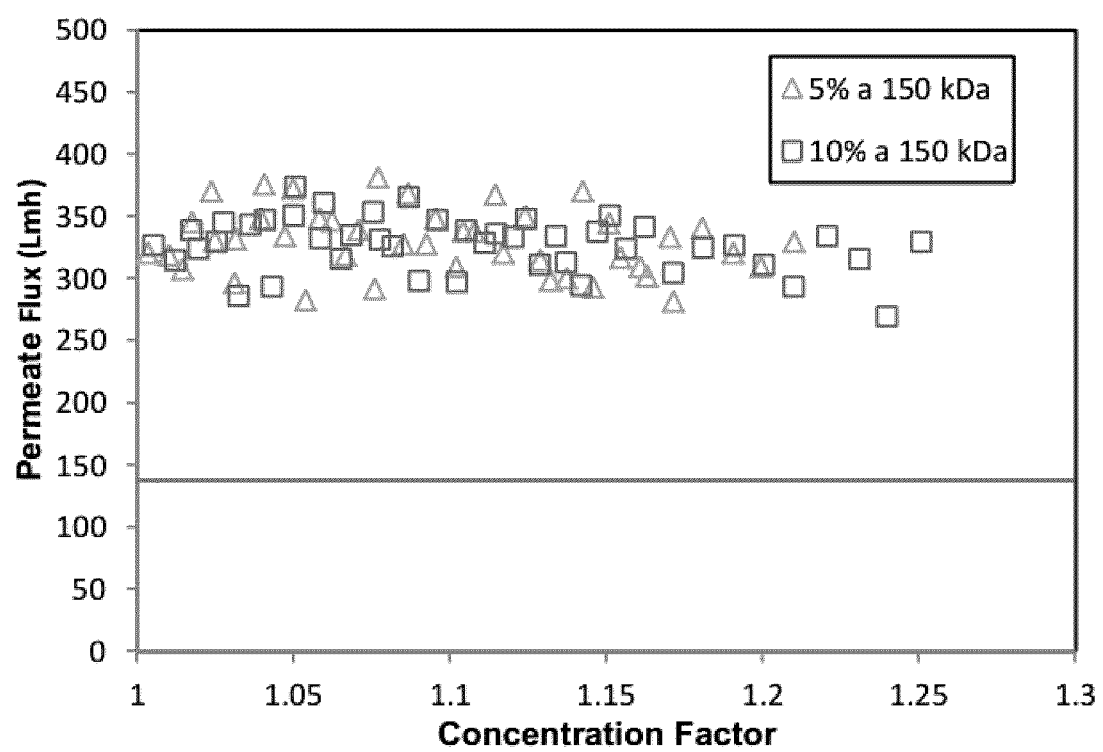
FIG. 2 is a graph showing permeate flux as a function of the concentration factor for the 150 kDa membranes modified with agent PEOTMS.
Figure 3:
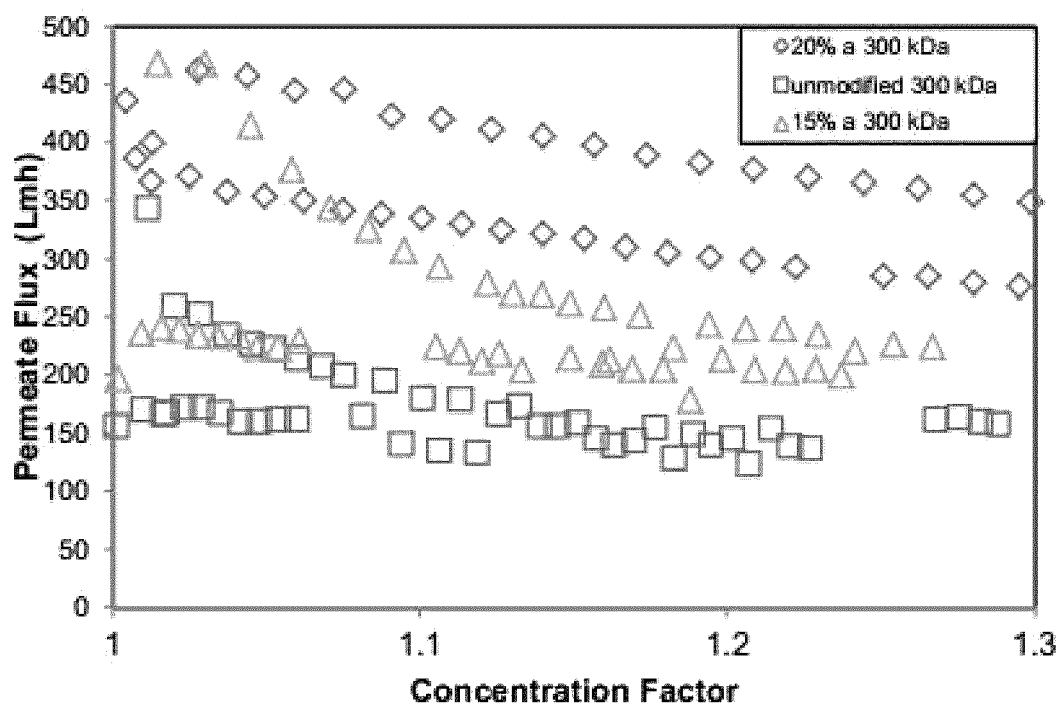
FIG. 3 is a graph showing permeate flux as a function of the concentration factor for the 300 kDa membranes modified with agent PEOTMS.

Hence, membrane flux was plotted as a function of the concentration factor in FIG. 2 for the 150 kDa and FIG. 3 for the 300 kDa pore sized membranes.

FIG. 2 is a graph showing permeate flux as a function of the concentration factor for the 150 kDa membranes modified with agent PEOTMS. The solid line at a flux of 142 lmh represents the flux of the unmodified membrane in the initial 42 minutes of its run.

FIG. 3 is a graph showing permeate flux as a function of the concentration factor for the 300 kDa membranes modified with agent PEOTMS.

From FIG. 2, it can be seen that the modified 150 kDa membranes maintained a high flux even when the feed water increased in concentration. The flux was also steady in the case of the 15% 300 kDa membrane shown in FIG. 3. After an initial decline, the flux of the 15% 300 kDa membrane was stable for the second collection of permeate following its recycling. The flux of the 20% 300 kDa modified membrane was much higher than those of the 15% 300 kDa and the untreated membrane.

The total organic carbon (TOC) content of the feed SAGD produced water, as well as the permeate of each run, was measured for use as an indicator of water cleanliness.

Figure 4:
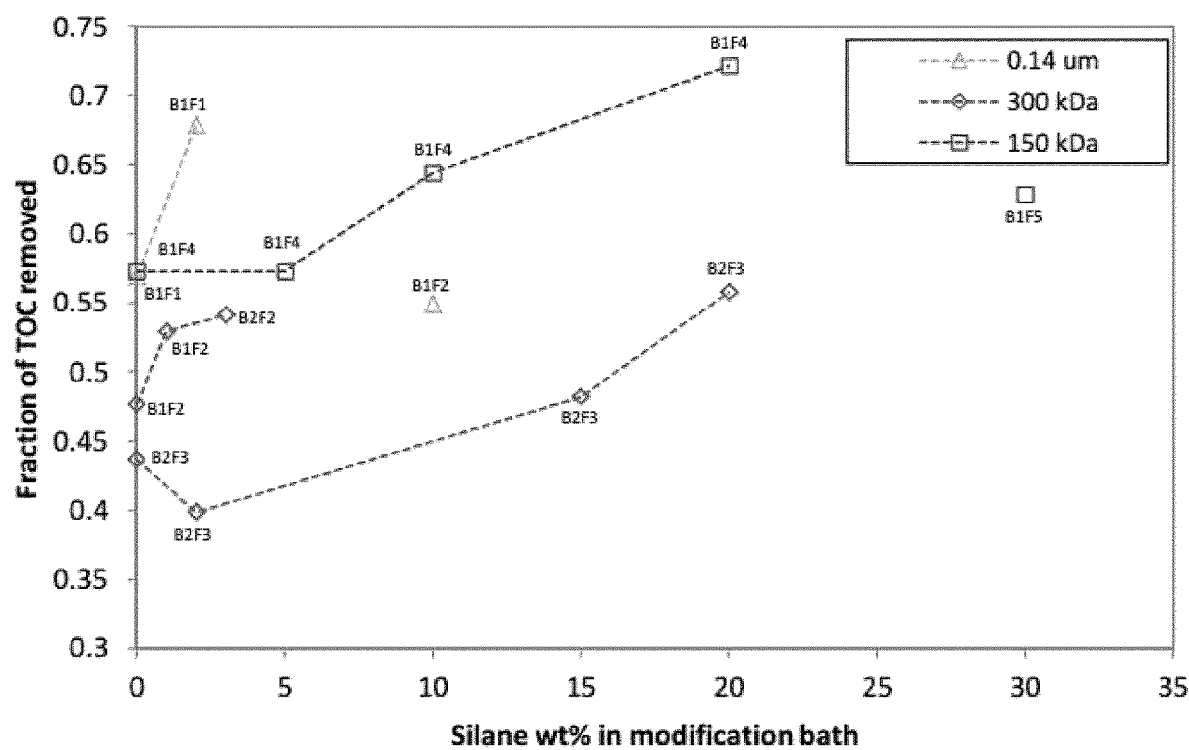
FIG. 4 is a graph of the fraction of the total organic carbon removed in the permeate relative to the feed SAGD wastewater as a function of the silane modification concentration.
Figure 5:
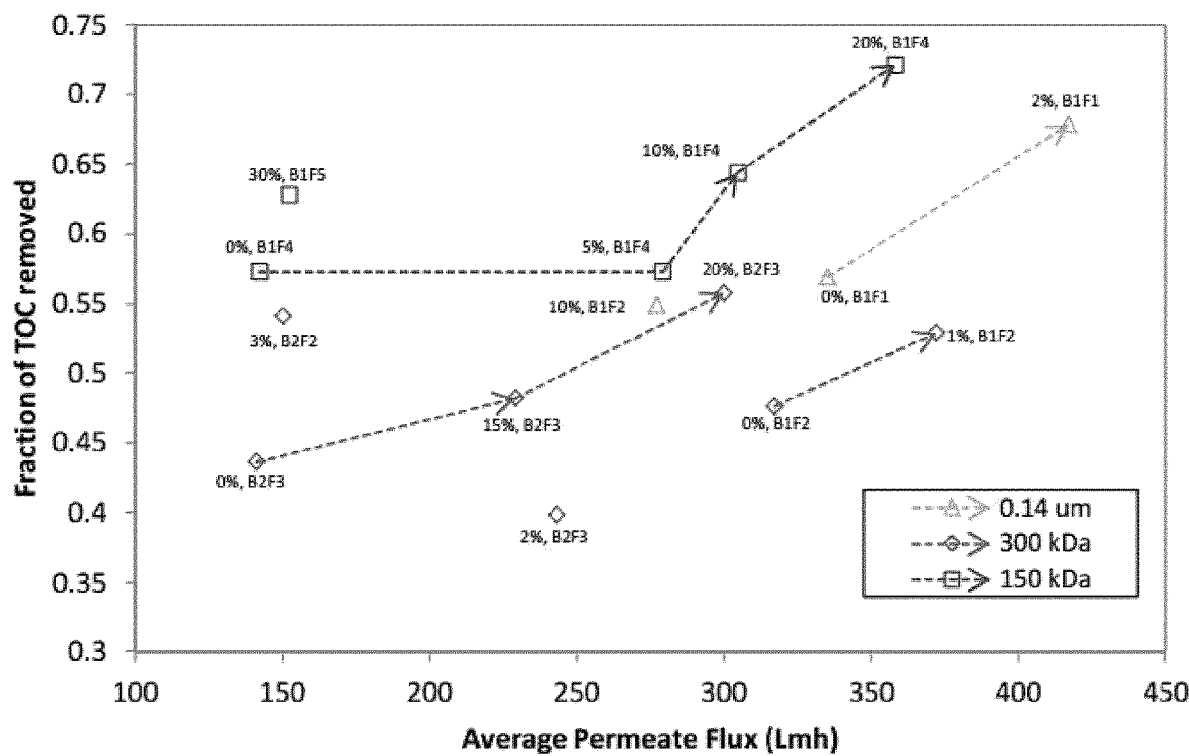
FIG. 5 is a graph of the fraction of the total organic carbon removed in the permeate relative to the feed SAGD wastewater as a function of the average permeate flux.

The fraction of the TOC removed in the permeate relative to the feed SAGD wastewater was plotted against both the silane modification concentration in FIG. 4 and the permeate flux in FIG. 5. This was done for the 150 kDa, 300 kDa and 0.14 μm membranes.

In FIG. 4, the dashed lines indicate the correlation observed for membrane filtration tests using the same feed sample. It was observed that, in all cases, the silane surface modification lead to an increase in TOC separation when compared to the respective unmodified membranes. While the 10% PEOTMS 0.14 μm membrane showed a poorer TOC separation relative to the unmodified 0.14 μm membrane, this can be attributed to the fact that the filtration test of this particular membrane was conducted using a different feed. This feed sample possessed a higher concentration of bituminous organic compounds. The higher concentration of foulants in the feed would have thus lead to a reduction in TOC removal in comparison to the unmodified membrane that used a different feed. The same explanation can be applied to the 30% 150 kDa membrane, which showed a decrease TOC separation.

In FIG. 5, the dashed lines and arrows indicate the general trend observed for filtration tests using the same feed sample and membrane batch. Since permeate flux was a parameter of interest in this comparison, both the membrane batch and the feed sample have been taken into consideration. It is observed that surface modification with silane PEOTMS leads to an increase in both permeate flux and TOC removal for all three sets of the tested ceramic membranes.

Moreover, increasing the concentration of the silane in the modifying solution resulted in further improvement in separation and permeate flux. Hence, for the 150 and 300 kDa membranes, the highest silane concentration tested of 20% was found to be optimal in terms of maximizing flux and separation performance. The results of the TOC analysis demonstrate that the modification is successful in improving the rejection of bituminous organics during filtration of SAGD produced water.

As a method of characterizing the performance of the ceramic membranes used, the particle size distributions of both the feed and permeate samples were determined. The particle distribution of all feeds was measured.

Figure 6:
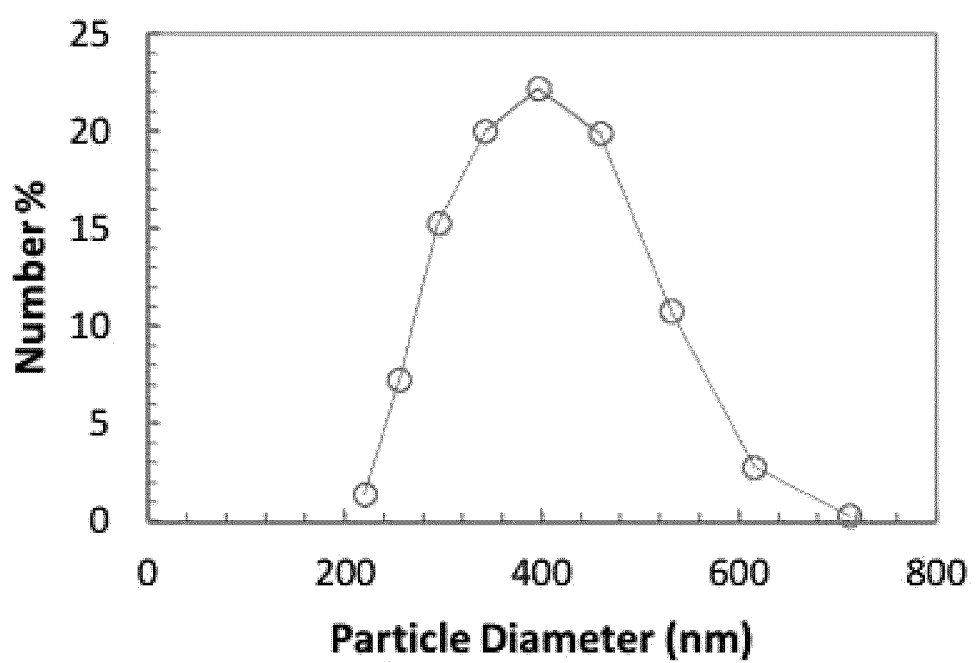
FIG. 6 is a graph showing the average particle size distribution of the SAGD produced water feed versus the particle diameter.

The particle size distribution did not vary significantly, containing particles ranging from 220 to 710 nm in diameter. The average of these distributions was plotted in FIG. 6.

The bituminous ultrafines in the tar sands are known to possess dimensions that are inferior to 300 nm, as such the larger particles seen in the produced water feed are attributed to aggregates of bituminous ultrafines that are formed by coagulation. The high salt content in the wastewater may cause the compaction of flat clay platelets to form larger clusters of three-dimensional structures.

Figure 7:
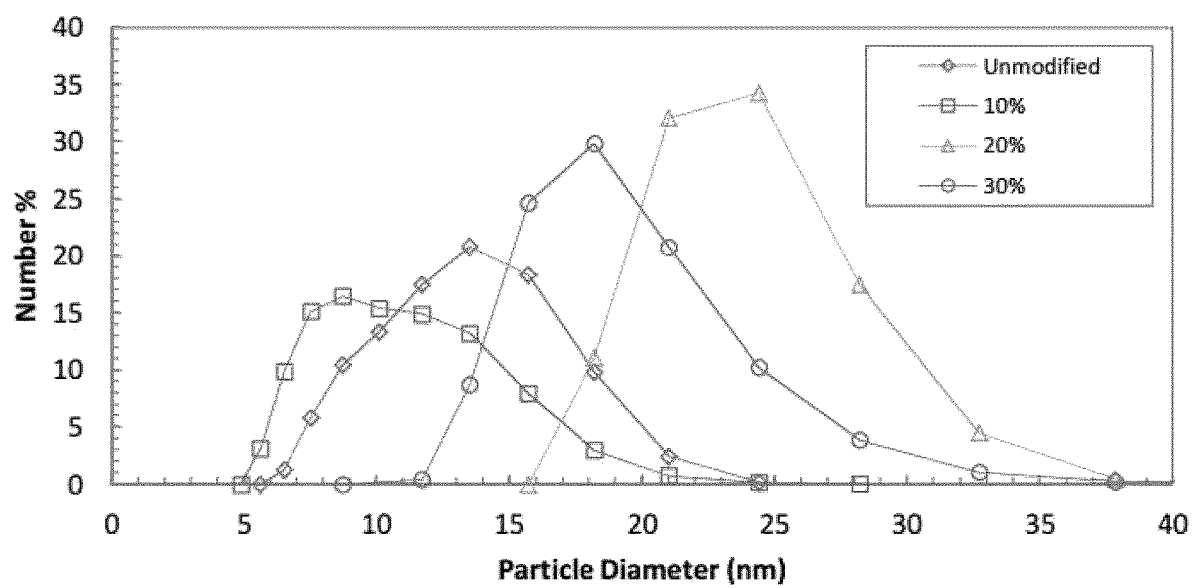
FIG. 7 is a graph showing the particle size distribution of permeate samples from the 150 kDa membranes versus the particle diameter.
Figure 8:
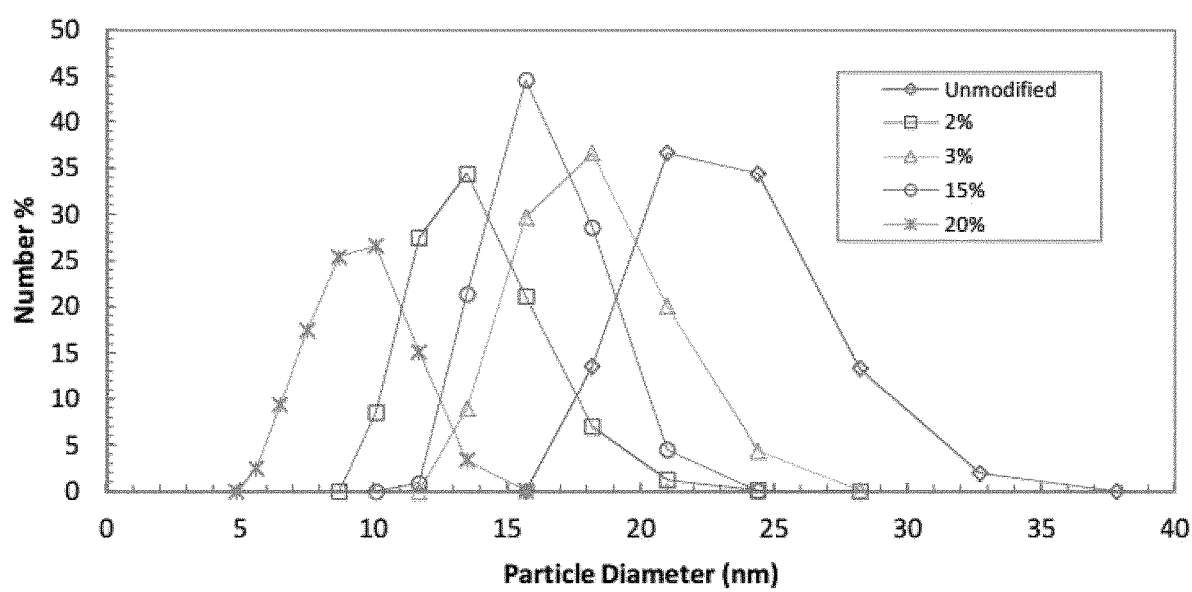
FIG. 8 is a graph showing the particle size distribution of permeate samples from the 300 kDa membranes versus the particle diameter.
Figure 9:
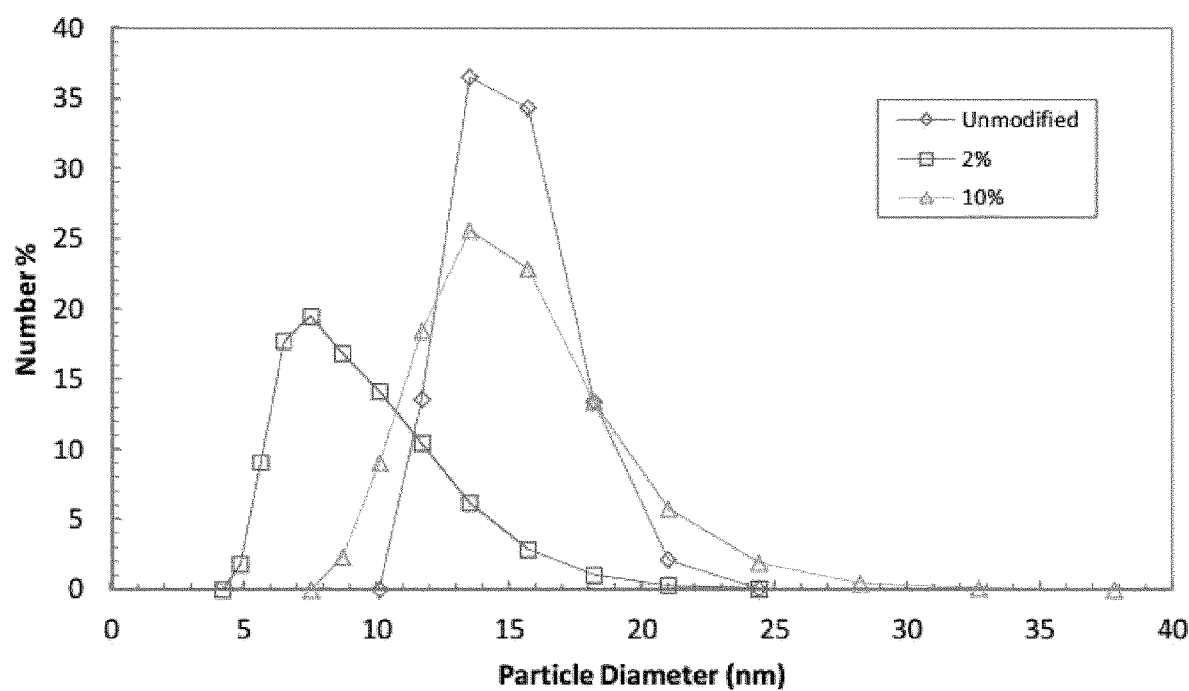
FIG. 9 is a graph showing the particle size distribution of permeate samples from the 0.14 μm membranes versus the particle diameter.

The particle size distribution of the permeates obtained from the 150 kDa, 300 kDa and 0.14 μm membranes are shown in FIGS. 7, 8 and 9, respectively.

These distributions are reported along with the corresponding concentration of the silanating agent. All of the distributions show that the particle diameters in the permeates do not exceed 40 nm. The corresponding pore diameters of the 150 kDa and 300 kDa MWCO membranes are approximately 21.5 nm and 30 nm, respectively, based on the size of dextran and pullulan molecules. The distributions observed for permeate samples from these membranes are, therefore, in accordance with their pore sizes. The fact that filtration with the 0.14 μm membranes resulted in permeates with similar distributions to those obtained from the 150 and 300 kDa membranes show that the SAGD wastewater feed does not possess a high concentration of particles with a diameter in the approximate range of 40 to 200 nm.

In the case of the 300 kDa membranes, it was observed that the silane surface modified membranes all gave particle size distributions that were smaller compared to the unmodified membrane. The same can be seen for the 10% PEOTMS 150 kDa and 2% PEOTMS 0.14 μm membranes. This is attributable to the pore size reduction that may occur upon surface silanation of the membranes. All other modified membranes resulted in distributions that were similar to, if slightly larger than, the unmodified membranes. Altogether, the small particle sizes observed when analyzing the permeate samples demonstrate that all of the ceramic membranes tested were effective in terms of rejecting the various sub-micron sized particles and colloids found in the feed.

Ceramic flat ultra- and micro-filtration membrane disks with pore sizes of 150 kDa, 300 kDa and 0.14 μm were modified using an organosilane surface modifying agent. The results demonstrate that modified ceramic membranes exhibit fouling-resistant properties to bituminous solids and consequently enhance their performance in treating SAGD produced waters. Modification agent PEOTMS more than doubled the flux of the 150 kDa and 300 kDa ceramic membranes in treating these process waters relative to the unmodified membranes. The modified ceramic membranes were also found to remove up to 72% of the total organic carbon found in SAGD produced water, ensuring water cleanliness for recycling. All of the ceramic membranes tested were shown to reduce the particle sizes in the produced water from >200 nm in the feed to <40 nm in the permeate. The observed trends show that higher silane concentrations in the modification bath lead to higher permeate flux and improved water quality.

Although the present invention has been described in considerable detail with reference to certain preferred embodiments thereof, other embodiments and modifications are possible. Therefore, the scope of the appended claims should not be limited by the preferred embodiments set forth in the examples, but should be given the broadest interpretation consistent with the description as a whole.

The invention claimed is:

1. A modified ceramic membrane for treatment of wastewaters and produced waters from oil sands operations, said wastewaters and produced waters containing fine bituminous clays, the modified ceramic membrane comprising:
   a ceramic membrane, and
   an outer surface of said ceramic membrane is modified by
      a hydrophilic organosilane, wherein said organosilane is selected from the group consisting of:
      $CH_3O(C_2H_4O)_x(CH_2)_ySi(OCH_3)_3$;
      $CH_3O(C_2H_4O)_x(CH_2)_ySi(OCH_2CH_3)_3$;
      $(CH_3O)_3Si(CH_2)_yO(C_2H_4O)_x(CH_2)_ySi(OCH_3)_3$; and
      $(CH_3CH_2O)_3Si(CH_2)_yO(C_2H_4O)_x(CH_2)_ySi(OCH_2CH_3)_3$,
      where x is >4 and y is >0,
      wherein the modified surface is without ionic charges.

2. The modified ceramic membrane according to claim 1, wherein a support layer of the ceramic membrane is composed of $TiO_2$ and/or alumina.

3. The modified ceramic membrane according to claim 1, wherein a selective layer of the membrane is composed of alumina.

4. The modified ceramic membrane according to claim 1, wherein a selective layer of the membrane is composed of $ZrO_2$.

5. The modified ceramic membrane according to claim 1, wherein a selective layer of the membrane is composed of $TiO_2$.

6. The modified ceramic membrane according to claim 1, wherein a selective layer of the membrane comprises a mixture of $ZrO_2$ and $TiO_2$.

7. The modified ceramic membrane according to claim 1, wherein a selective layer of the membrane comprises a mixture of alumina and $TiO_2$.

8. The modified ceramic membrane according to claim 1, wherein a selective layer of the membrane comprises a mixture of alumina and $ZrO_2$.

9. The modified ceramic membrane according to claim 1, wherein the hydrophilic organosilane is 2-[methoxy(polyethyleneoxy)6-9 propyl]trimethoxysilane.

10. A method of treatment of wastewaters and produced waters from oil sands operations, said wastewaters and produced waters containing fine bituminous clays, the method comprising:
modifying an outer surface of a ceramic membrane by silanization of the ceramic membrane with an aqueous alcohol solution of a hydrophilic organosilane to provide a modified ceramic membrane,
wherein said organosilane is selected from the group consisting of:
$CH_3O(C_2H_4O)_x(CH_2)_ySi(OCH_3)_3$;
$CH_3O(C_2H_4O)_x(CH_2)_ySi(OCH_2CH_3)_3$;
$(CH_3O)_3Si(CH_2)_yO(C_2H_4O)_x(CH_2)_ySi(OCH_3)_3$; and
$(CH_3CH_2O)_3Si(CH_2)_yO(C_2H_4O)_x(CH_2)_ySi(OCH_2CH_3)_3$,
where x is >4 and y is >0,
wherein the modified surface is a hydrophilic surface without ionic charges; and
feeding the wastewaters and produced waters from oil sands operations through the modified ceramic membrane.

11. The method according to claim 10, wherein a support layer of the ceramic membranes is composed of $TiO_2$ and/or alumina.

12. The method according to claim 10, wherein a selective layer of the membranes is composed of alumina.

13. The method according to claim 10, wherein a selective layer of the membranes is composed of $ZrO_2$.

14. The method according to claim 10, wherein a selective layer of the membranes is composed of $TiO_2$.

15. The method according to claim 10, wherein a selective layer of the membrane comprises a mixture of $ZrO_2$ and $TiO_2$.

16. The method according to claim 10, wherein a selective layer of the membrane comprises a mixture of alumina and $TiO_2$.

17. The method according to claim 10, wherein a selective layer of the membrane comprises a mixture of alumina and $ZrO_2$.

18. The method according to claim 10, wherein the hydrophilic organosilane is 2-[methoxy(polyethyleneoxy) 6-9 propyl]trimethoxysilane.

19. The method according to claim 10, wherein the water purification is for the treatment of bitumen containing process waters and wastewaters.

20. The method according to claim 10 for treatment of oil sands produced water with organic and inorganic substances that possess high scale forming potential.

21. The method according to claim 20, wherein the oil sands produced water is from a steam assisted gravity drainage (SAGD) and Cyclic Steam Stimulation (CSS) process.

* * * * *